United States Patent
Colby et al.

(10) Patent No.: US 7,581,437 B2
(45) Date of Patent: Sep. 1, 2009

(54) LEVEL SENSOR FOR GRANULES IN WATER

(75) Inventors: Edward Colby, Cambridge (GB); Neil Stewart, Bromley (GB)

(73) Assignee: Masco Corporation, Taylor, MI (US)

( * ) Notice: Subject to any disclaimer, the term of this patent is extended or adjusted under 35 U.S.C. 154(b) by 179 days.

(21) Appl. No.: 11/399,915

(22) Filed: Apr. 7, 2006

(65) Prior Publication Data

US 2007/0234797 A1    Oct. 11, 2007

(51) Int. Cl.
*G01F 23/22* (2006.01)
(52) U.S. Cl. .................... 73/61.71; 73/304 R
(58) Field of Classification Search ............. 73/61.71, 73/304 R, 149
See application file for complete search history.

(56) References Cited

U.S. PATENT DOCUMENTS

| 4,158,165 A | | 6/1979 | Coates |
| 4,188,826 A | | 2/1980 | Kankura et al. |
| 4,392,110 A | * | 7/1983 | El-Menshawy et al. ..... 324/453 |
| 5,811,973 A | | 9/1998 | Meyer, Jr. |
| 6,122,956 A | * | 9/2000 | Klausner et al. ........... 73/61.71 |
| 6,237,412 B1 | | 5/2001 | Morimoto |
| 6,269,694 B2 | | 8/2001 | Morimoto |

FOREIGN PATENT DOCUMENTS

WO    WO 95/12704    5/1995

OTHER PUBLICATIONS

International Preliminary Report on Patentability dated Oct. 16, 2008.

* cited by examiner

*Primary Examiner*—Daniel S Larkin
(74) *Attorney, Agent, or Firm*—Edgar A. Zarins; Nirav D. Parikh; Carlson, Gaskey & Olds

(57) ABSTRACT

The present invention relates to a system for measuring the level of granular material in a container immersed in an aqueous medium, particularly, but not exclusively, for use as a measure of sanitizer level in spa and whirlpool halogenation systems. Electrodes fixed in the container wall are used to measure the electrical conductance along a path which is part filled with the granular material. Coils of wire are arranged such that the interrogating signal is coupled inductively to the sensor head. In this way the granule container can be made demountable, with no bare conductor material exposed to the aqueous medium. A separate reference circuit is used to measure the conductivity of the water in the system, and this signal is used to normalize the signal obtained from inside the container.

17 Claims, 2 Drawing Sheets

LEVEL SENSOR FOR GRANULES IN WATER

FIELD OF THE INVENTION

This invention relates to the field of measurement of granule fill level in submerged capsules in an aqueous environment, particularly but not exclusively for use as a measure of sanitizer level in spa and whirlpool halogenation systems.

BACKGROUND

A low-cost robust and reliable technical solution is required to address the need for monitoring spa and whirlpool halogenation systems. Owing to the comparatively heavy organic loading of whirlpool tubs, and the potential for foul water to sit in the suction line for extended periods in between usage, there is a need to disinfect the water as it re-circulates. Cartridge-based systems release controlled amounts of sanitizer directly in to the water flow system. Since the cartridge has a finite source of sanitizer, indication is needed to confirm that the cartridge contains a significant amount of sanitizer. Eventually the cartridge will become depleted, necessitating replacement. In the case of the sanitizing agent being a product of slow decomposition of an insoluble solid, it is possible to monitor the level of sanitizing agent by measuring the remaining level of solid matter within the cartridge. There are many techniques for measuring fill level within a container. These include paddle switches, ultrasonic, electromagnetic wave and capacitive measurements. Invariably these measurements assume that the space not filled is occupied by air or vacuum, such that the conductivity is zero and the relative dielectric constant is unity.

Of particular relevance is, for example, U.S. Pat. No. 6,237,412, which describes a capacitative sensing technique for liquid level measurement. This is extended by U.S. Pat. No. 6,269,694 to include powder level measurement. U.S. Pat. No. 4,188,826 describes a resistance measurement for the level of a conductive liquid. Additionally WO95/12704A1 describes sensors for dosing washing machines with detergent by way of measuring the conductivity of the soap solution.

In the field of geophysics the well-known Archie equation describes the relationship between porosity and resistivity in reservoir rocks, and measurement of rock sample resistivity is a standard analytical technique. A method has been developed as described in U.S. Pat. No. 4,158,165 using inductive coupling of radio frequency signals to produce a non-contact sensor which can be used in a bore hole. This teaching has been extended in U.S. Pat. No. 5,811,973 to measure both real and imaginary parts of the sample impedance.

This invention is an improvement over the existing techniques because it uses a well established method for characterizing porous rock samples to determine the fill level of man-made granular, insulating material in an aqueous environment. Additionally, the electrical signal may be extracted from the cartridge by a two-part inductive link. In this way, the simplicity and sensitivity of the direct connection to the porous medium is maintained whilst no conductive elements apart from the measurement electrodes are exposed to the potentially corrosive aqueous environment, leading to long and reliable operation.

SUMMARY OF THE INVENTION

This invention describes a system for monitoring the fill level of a granular, insulating material in an aqueous environment. Two electrodes are placed in the volume where the granular material is contained by the cartridge, such that the total electrical conductance through the water which fills the inter-granular space will vary depending on the amount of material present. When the conductivity of the water in the system is known, the volume fraction of insulating material can be estimated.

BRIEF DESCRIPTION OF THE DRAWINGS

Embodiments of the invention will now be described, by way of example, with reference to the accompanying drawings, in which.

DETAILED DESCRIPTION

Figure 1:
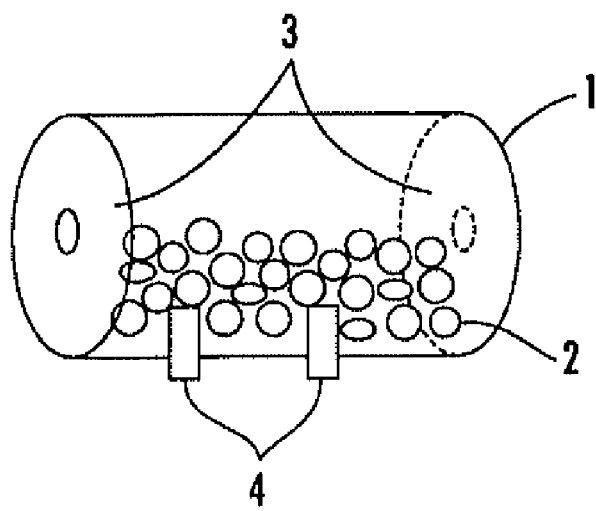
FIG. 1 illustrates a cartridge, made from an insulating material, fitted with two graphite electrodes penetrating into the cartridge interior, and part filled with granular sanitizing agent.
Figure 2:
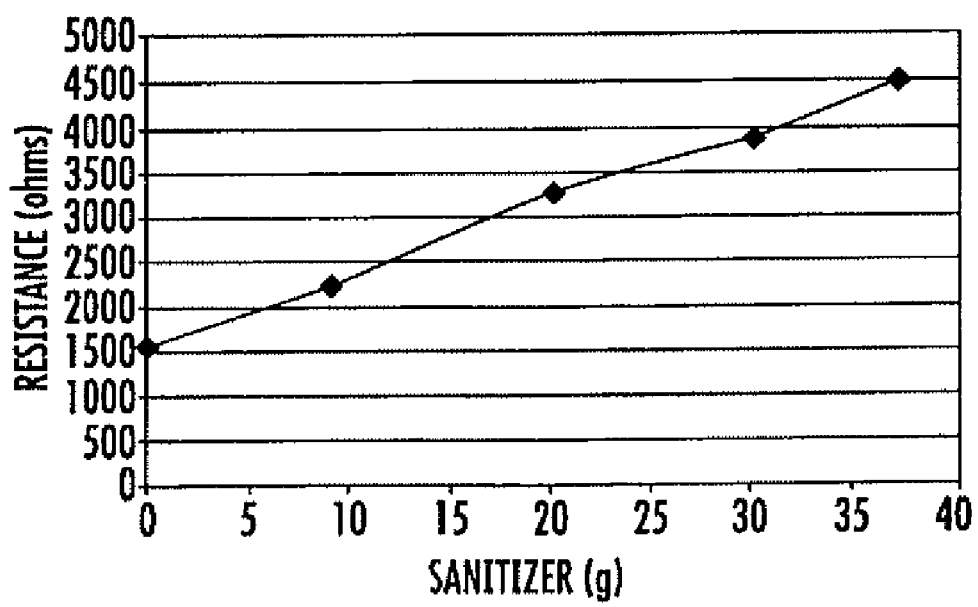
FIG. 2 illustrates a graph of resistance readings for an example cartridge as a function of weight of a particular sanitizing agent added to the cartridge.
Figure 4:
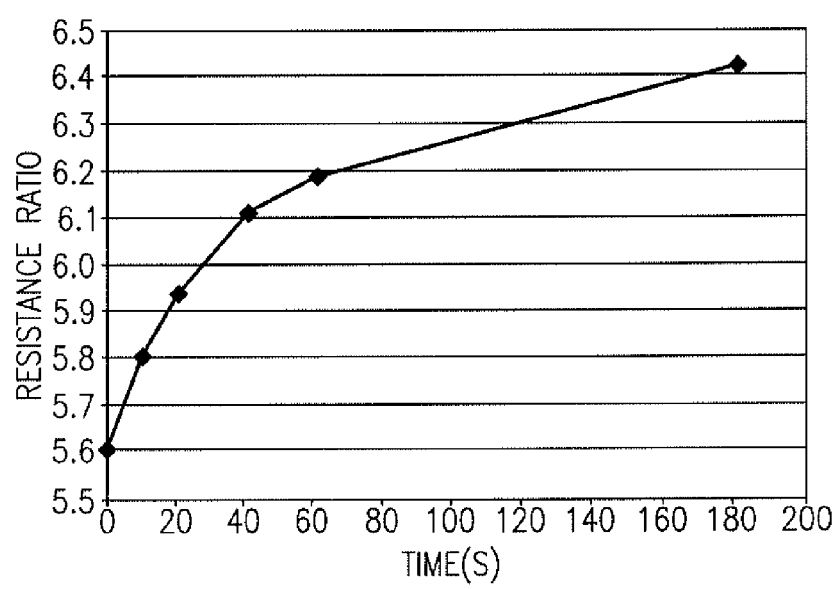
FIG. 4 shows a graph of the variation of the ratio of measured cartridge to reference resistances as a function of time after the pumping system is started, following a period of stagnation.

FIG. 1 illustrates the cartridge 1, made from an insulating material and filled with sanitizing agent granules 2. Holes 3 are formed in the end walls of the cartridge 1, such that when the sanitizing agent decomposes, the decomposition products can diffuse or flow out into the main body of pipe work, and hence into the spa or whirlpool. Two graphite electrodes 4 are fitted through the bottom wall of the cartridge 1, and secured in place by a water-proof sealant. An electrical measurement, preferentially an alternating current signal, is made between the two electrodes 4, to determine the conductance or resistance. The granule fill level can be related to this measurement, as shown in FIG. 2, where the resistance in the cartridge 1 has been measured for a number of weights of sanitizer loaded in to the cartridge 1. In the case of gradually decomposing sanitizer, the granules 2 will tend to settle on the bottom of the cartridge, as indicated in FIG. 1. The conductance measured inside the cartridge 1 will be the sum of numerous percolation paths around the insulating granules 2. The exact nature and value of these will not be absolutely predictable, but if the granules 2 are manufactured in a consistent manner, then the variation in the resulting ensemble will be sufficiently small that the conductance measurement will be adequate to determine when the cartridge 1 is close to exhaustion. The reliability of the resistance measurement as an indication of fill level will also depend on the conductivity of the water. It is likely that the conductivity of the water will vary over time. To compensate for this, a reference measurement is made of the conductivity of the water outside the cartridge 1. The fill level is then determined from the ratio of the signal measured at the cartridge electrodes 4 to signal measured at the reference electrodes 9. This, however, assumes that the conductivity of the water in the vicinity of the reference electrodes 9 is the same as that inside the cartridge 1. This is evidently not true when the cartridge 1 has been left stagnant for a while, so that the decomposition products of the granules have locally enhanced the water conductivity, and a diffusion gradient exists between inside and outside the cartridge 1. This gradient is rapidly washed away when substantial flow past the cartridge 1 exists, as shown in FIG. 4, when the pumping system is started. By monitoring the time variation of the resistance ratio after initiation of pumping, it is possible to establish whether the entrance and exit holes 3 are clear or blocked.

Figure 3:
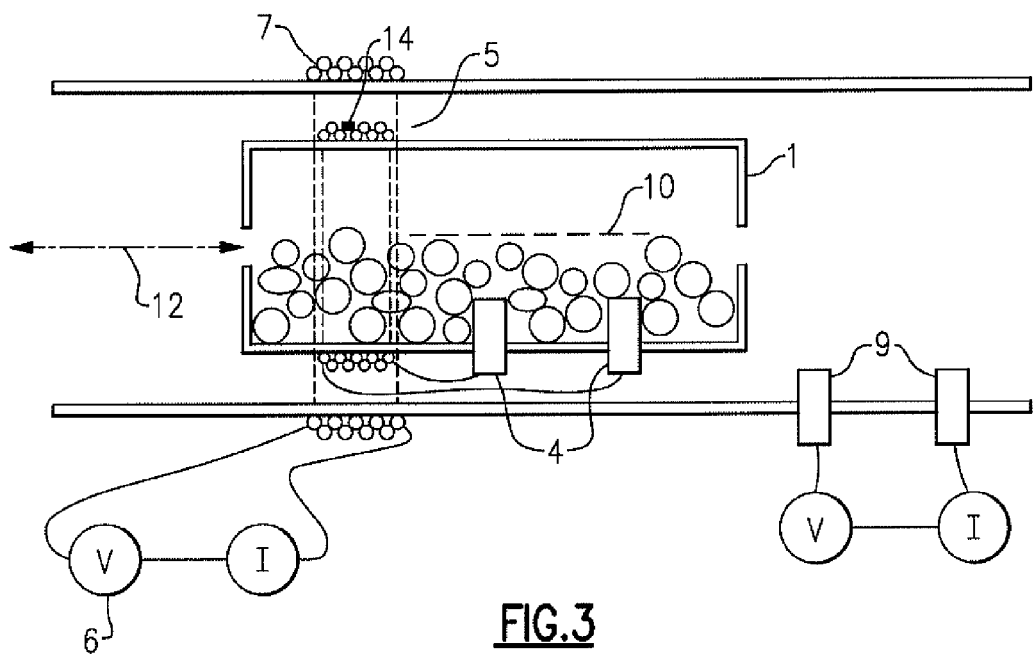
FIG. 3 illustrates the inductive coupling arrangement to the cartridge. This is a cross-sectional view of the cartridge in to a section of pipe which forms part of the water recirculating system of the spa.

In the case of a replaceable cartridge 1, it is advantageous to have non-contact signal coupling to the electrodes 4. In our preferred embodiment, shown in FIG. 3, this is done inductively. An insulated wire is wound around the body of the cartridge 1 to form a coil 5 and the ends connected to the electrodes 4. In this case, an axis 10 of the coil 5 is substantially parallel to a trajectory 12 along which the cartridge 1 is either inserted or extracted from the aqueous environment. The outer part of the electrodes 4 and the bare ends of the coil 5 are coated with insulating material, so that only the part of the electrodes 4 inside the cartridge 1 is in electrical contact with water. An alternating current signal 6 is applied to an outer coil 7, which couples inductively to the inner coil 5. By analyzing the real and imaginary parts of the current signal 8, the real part of current flowing through the inner coil 5, and hence the conductance between the electrodes 4, can be deduced. By use of inductive coupling, the cartridge 1 can be made demountable, with no bare conductor material exposed to the aqueous medium.

The reference electrodes 9 do not need to be replaced on a regular basis and so can be mounted on the wall of spa or whirlpool, adjacent to the cartridge 1. There is no particular advantage in making the connection to these electrodes 9 non-contact, and so are connected directly to their measurement circuit, for simplicity.

Further Embodiments

The electrodes 4 may be constructed of conductive material alternative to graphite. For example, stainless steel or chromium plated brass or other material commonly used for fixtures and fittings of sanitary ware. The electrodes 4 may be coated with a thin insulating protective layer of, for example, ceramic, such that the measuring signal couples capacitatively to the contents of the cartridge 1.

The coils 5, 7 may be wound in other ways apart from around the body of the cartridge. For example, the inner coil 5 may be placed on the outer wall of the cartridge 1, with its axis normal to the cartridge 1 axis, such that when the cartridge 1 is inserted in to position the secondary and primary coils lie substantially adjacent to each other.

The additional of a capacitor 14 to the inner coil 5 will make the circuit resonant, and with appropriate choice of stimulation frequency will make the system more sensitive to variations in conductance.

The invention claimed is:

1. An apparatus for measuring fill level of a cartridge containing granules or powder of a non-insulating material, in an aqueous environment, comprising:
    a cartridge;
    a plurality of electrodes on the inside of the cartridge;
    an alternating current impedance measuring circuit attached to the electrodes for measuring a cartridge impedance of the cartridge;
    a plurality of reference electrodes in the aqueous environment around the cartridge; and
    a reference circuit attached to the plurality of reference electrodes for measuring a reference impedance of the aqueous environment around the cartridge, such that the fill level of the granules or powder is determined from a ratio of the cartridge impedance to the reference impedance.

2. The apparatus for measuring fill level of a cartridge as in claim 1, wherein the electrodes comprise a material selected from a group consisting of stainless steel graphite, chromium, brass, ceramic, and combinations thereof.

3. The apparatus for measuring fill level of a cartridge as in claim 1, wherein the electrodes are coated with a thin insulating protective layer.

4. The apparatus for measuring fill level of a cartridge as in claim 1, wherein the granules or powder are a sanitizing agent for use in a spa or whirlpool halogenation system.

5. The apparatus for measuring fill level of a cartridge as in claim 1, wherein the plurality of reference electrodes are located entirely outside of the cartridge.

6. The apparatus for measuring fill level of a cartridge as in claim 1, wherein the plurality of reference electrodes are axially displaced from the cartridge.

7. The apparatus for measuring fill level of a cartridge as in claim 1, wherein the ratio of the cartridge impedance to the reference impedance is a ratio of a real part of the cartridge impedance to the reference impedance.

8. The apparatus for measuring fill level of a cartridge as in claim 1, wherein the alternating current impedance measuring circuit is inductively attached to the plurality of electrodes on the inside of the cartridge.

9. The apparatus for measuring fill level of a cartridge as in claim 1, wherein the cartridge includes a solid, continuous side wall circumscribing the inside of the cartridge and extending between opposed end walls, each end wall having an opening with a cross-sectional area that is smaller than a cross-sectional area of the inside of the cartridge.

10. An apparatus for measuring fill level of a cartridge containing granules or powder of a non-insulating material, in an aqueous environment, comprising:
    a cartridge;
    a plurality of electrodes on the inside of the cartridge;
    an alternating current impedance measuring circuit attached to the electrodes for measuring a cartridge impedance of the cartridge, the alternating current impedance measuring circuit comprising an insulated wire that is wrapped around the cartridge to form a coil and connected inductively to the electrodes; and
    a reference circuit for measuring a reference impedance of the aqueous environment, such that the fill level of the granules or powder is determined from a ratio of the cartridge impedance to the reference impedance.

11. The apparatus for measuring fill level of a cartridge as in claim 10, wherein the coil has an axis that is substantially parallel to the trajectory of the cartridge, as the cartridge is either inserted or extracted from the aqueous environment.

12. The apparatus for measuring fill level of a cartridge as in claim 10, wherein the coil has an axis that is substantially perpendicular to the trajectory of the cartridge, as the cartridge is either inserted or extracted from the aqueous environment.

13. The apparatus for measuring fill level of a cartridge as in claim 10, further comprising a capacitor that is attached to the coil in order to make the circuit resonant.

14. A method for use with a cartridge containing granules or powder of a non-insulating material, in an aqueous environment, whereby the fill level of granules or powder is determined from a ratio of cartridge conductance within the cartridge to a reference conductance of the aqueous environment around the cartridge.

15. A method for use with a cartridge containing granules or powder of a non-insulating material, in an aqueous environment, whereby the fill level of granules or powder is determined from a ratio of a real part of an inductively measured complex impedance signal to a reference conductance.

16. The method as in claim 15, further comprising discriminating between the real part of the inductively measured complex impedance signal and an imaginary part of the inductively measured complex impedance signal to thereby separate the real part and the imaginary part such that the imaginary part is excluded in determining the ratio.

17. The method as in claim 15, wherein the reference conductance is taken from the aqueous environment around the cartridge.

* * * * *